UNITED STATES PATENT OFFICE.

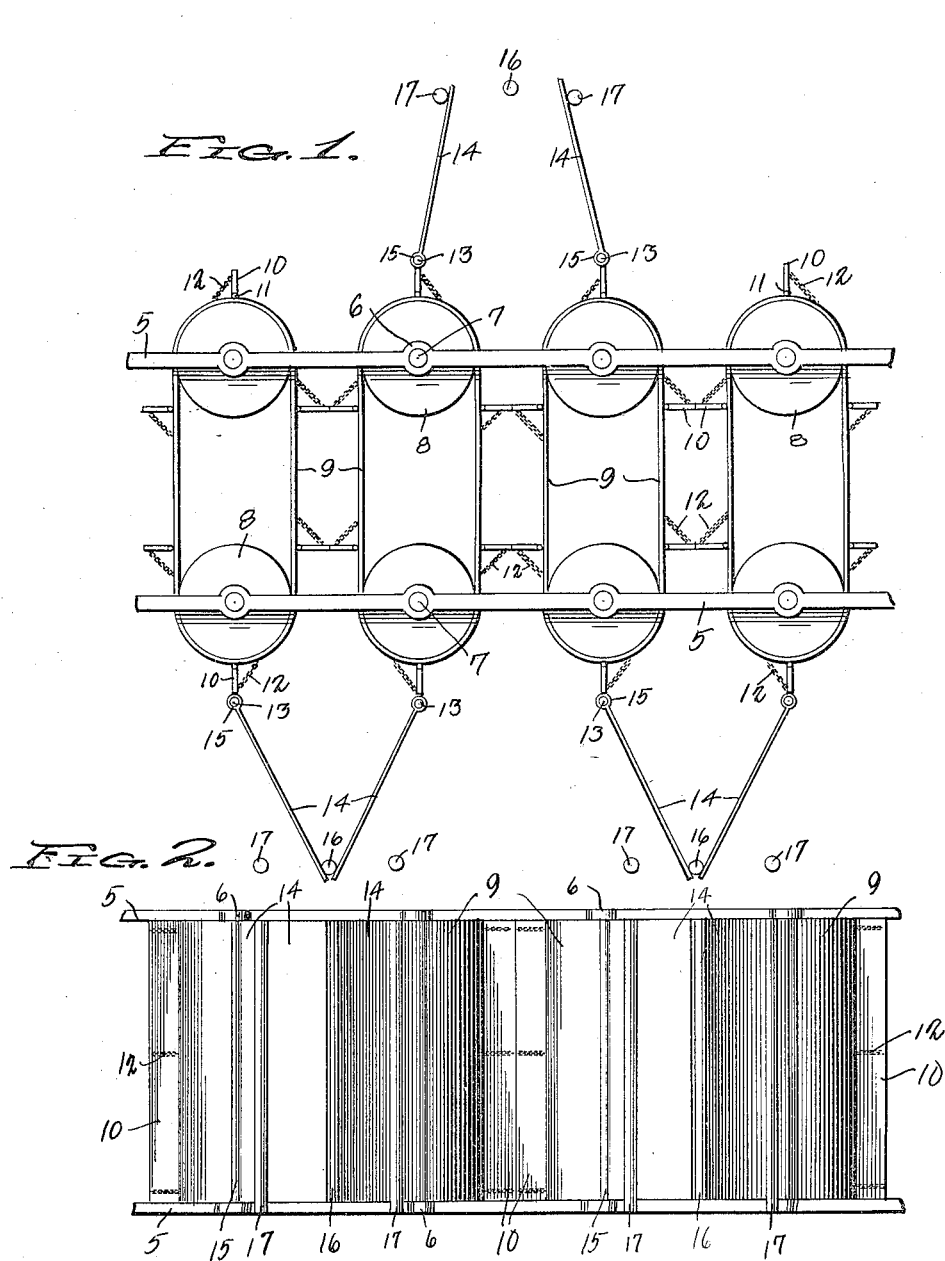

ROBERT C. PRATT, OF CALHOUN, OKLAHOMA.

WATER-POWER DEVICE.

1,320,650. Specification of Letters Patent. Patented Nov. 4, 1919.

Application filed March 26, 1918. Serial No. 224,810.

*To all whom it may concern:*

Be it known that I, ROBERT C. PRATT, a citizen of the United States, residing at Calhoun, in the county of Le Flore and State of Oklahoma, have invented certain new and useful Improvements in Water-Power Devices, of which the following is a specification.

This invention is a water power device and has for its principal object the production of mechanism which is placed in a stream or body of water to receive power from said body of water irrespective of the manner of movement of the water.

Another object of this invention is the production of a water power device wherein drums are rotatably mounted upon frames and have belts positioned thereon, vanes mounted upon the belts to receive the force of water thereagainst to drive the belts and rotate the drums.

Another object of this invention is the production of a water power device wherein a number of flood gates are provided to prevent the passage of water in one direction, although being formed to open and permit the water to flow in the opposite direction, thus causing the water to be properly directed along channels for having a maximum amount of force for the device.

Broadly stated, this invention consists of a frame having drums rotatably mounted thereon, endless belts positioned upon the drums, vanes pivotally mounted upon the belts and held from movement beyond a predetermined point, thus causing the velocity of water directed thereagainst to drive the belts and pivotally mounted flood gates carried adjacent the drums, thus causing the flood gates to be closed under certain conditions and direct the flow of water on the proper vanes for rotating the drums.

With the above and other objects in view, this invention consists of certain novel combinations, constructions and arrangement of parts as will be hereinafter fully described and claimed.

One practical form of construction and assembly of the present invention will be hereinafter described and is illustrated in the accompanying drawing, in which Figure 1 is a top plan view of the water power device, and Fig. 2 is an elevation of one end of the device.

Referring to the accompanying drawing by numerals, it will be seen that the water power device comprises a frame consisting of a number of parallel supporting bars 5 having bearing portions 6 formed at spaced intervals therealong. The shafts 7 are rotatably mounted within the bearings 6 and having the drums 8 connected thereto in any suitable manner. It is of course obvious that the shafts 7 may be connected by any suitable means to any desired structure or mechansm to be driven by the operation of the water power device.

Endless belts 9 extending transversely of the supporting frame, pass around each pair of rollers 8, as will be seen by referring particularly to Fig. 1.

The vanes 10 are pivotally mounted as indicated at 11, upon the belts 9 while chains 12 have their ends connected to the vanes 10 and the belts 9. It is obvious that when water is directed against the vanes a number of the vanes will be held extended to pull upon the belts and cause the drums 8 to rotate, while like movement of water upon the opposite side of the belts will cause the vanes to swing to closed positions owing to the flexible nature of the chains 12. Notwithstanding the chains are flexible, however, it is obvious that when the water is directed upon the same side of the vanes to which the chains are connected the vanes will be held in extended positions to draw upon the belts for moving the same.

By referring to Fig. 1, it is noted that the belts extend adjacent each other and for this reason when the belts are being driven in one direction the vanes will tend to close the space between the belts, to cause the belts to receive the full benefit of the water being directed therebetween. Owing to the pivotal support of the vanes, it is noted the device can be used in various bodies of water. It could not only be used in a river or other flowing stream where the current will actuate the same, but it can be used in bodies of water, such as a bay or ocean where there is an ebb and flow of the tide, for notwithstanding the direction of movement of the water the belt will be continuously driven in the same direction, for rotating the drums in the same direction.

For the purpose of directing the water at such times between proper portions of the device, there are provided a number of supporting posts 13 at various intervals along the supporting frame and upon both sides thereof and in alinement with the drums. The elongated vertically extending flood gates 14 have sleeves 15 movably mounted upon the supporting posts 13. Steadying posts 16 are provided for the flood gates 14 for holding the same from swinging too far in certain directions while abutment posts 17 are positioned near the steadying posts 16. Therefore when the flood gates swing away from the post 16, their movement will be limited by the abutment posts 17, it being noted that the posts 17 are placed so that when the gates 14 engage the same the gates will be held to extend at slightly oblique angles to the frame 5 and will not extend at right angles thereto. Therefore, on the ebb of the tide, the water will strike the gates and swing the same to engage the steadying posts 16. By referring to Fig. 1, it will be seen that the flood gates 14 upon one side of the frame are closed to constitute a guide for directing the flow of water between the portions of the device, while the gates upon the opposite side of the frame are in an open position, to allow water to pass freely therebetween.

Accordingly, on the inflow of the tide, the volume of water will be sufficient to pass between the various belts and consequently collapse a number of the vanes although the power will be exerted upon the vanes which are forced to open position for driving the belts and rotating the drums. However, upon the ebb of the tide or the return of the water, the force thereof will swing the flood gates 14 to engage steadying posts 16 for it is obvious that on the inflow, the passage of water between various belts will move these flood gates to open positions to engage the abutment posts 17. As these flood gates are moved to a closed position as indicated in Figs. 1 and 2, it is obvious the water will be deflected in its entire volume between the portions of the device which are obstructed only by the vanes and for this reason the vanes will be moved to move the belts and drive the drums.

From the foregoing description, it will be seen that a very simple and efficient water power device has been constructed which may be used in water where current is also present or in bodies where there is ebb or flow in the tide, under such conditions it is obvious the drums will be continuously rotating in the same direction. The vanes will remain open when proper direction of water engages the same to drive the belts, although when the water moves in a reverse direction the vanes will collapse so as to relieve unnecessary resistance. It will also be seen that if desired flood gates may be provided for opening and permitting the water to pass through under some conditions although closing to constitute guides for directing the entire volume of water on its return between the belts to engage certain of the vanes and thus cause the drums to continue in their rotation in one direction.

As only one form of the present invention has been herein illustrated and described, it is obvious many minor modifications can be made without departing from the spirit of the present invention, as long as such changes do not exceed the scope of the invention as claimed.

What is claimed is:

1. In a device of the class described, the combination of a supporting means, drums mounted upon said supporting means, belts carried by said drums, vanes carried upon said belts, posts carried adjacent said drums, flood gates, pivotally mounted upon said posts, some of said flood gates being adapted to open and others to close to allow water to engage the vanes and drive said belts, thus constituting a guide for directing the water to engage vanes in different positions for causing said drums to rotate in the same direction.

2. In a device of the character described, the combination of a water driven mechanism including a plurality of channel ways therethrough, hingedly supported flood gates carried upon each side of said mechanism in staggered relation, means for limiting the swinging movement of said gates whereby said gates will swing to opened or closed position according to the direction of movement of water engaging the same, whereby the water will be directed through proper channels of said mechanism for continuously driving the mechanism in one direction.

3. In a device of the character described, the combination of a plurality of parallel supporting bars, vertical shafts carried by said supporting bars, drums rotatably mounted upon said shaft, thereby providing two series of equally spaced drums, belts passing around said drums, movable vanes mounted upon said belt, flood gates hingedly mounted upon opposite sides of said bars in staggered relation to each other, means for limiting the swinging movement of said gates, the equal spacing of said drums and the belts thereon forming a plurality of channel ways through a device, whereby said gates will move to opened or closed position according to the direction of movement of water engaging the same, thus properly deflecting the water to pass through certain of the channels to properly engage said vanes for continuously rotating said drum.

4. In a device of the character described, the combination of a water driven mechanism, of a deflecting means including a plurality of vertically extending spaced posts carried adjacent said water driven mechanism, a pair of comparatively flat vertically extending flood gates having vertical sleeves thereon engaging said posts, thus pivotally supporting said gates, a centering post positioned forwardly from said first mentioned post, abutting posts carried in alinement with and upon each side of said centering post, whereby said centering post and said abutting posts will be in the path of movement of said flood gate as the same swing to open or closed positions, thus deflecting water passing to said mechanism or permitting water to pass freely in the opposite direction therethrough.

5. In a device of the character described, the combination of a water driven mechanism including a plurality of channel ways therethrough, pairs of flood gates positioned upon opposite sides of said mechanism in staggered relation, each pair of flood gates including comparatively flat vertically extending gates having sleeves, posts carried adjacent said mechanism for receiving said sleeves to pivotally support said gates, centering posts spaced outwardly beyond said first mentioned post, abutting posts positioned upon each side of said centering post, said centering and abutting posts being in the path of movement of said gates as the same swing to open or closed positions, whereby water will be directed through the channels of said mechanism for continuously driving the mechanism in one direction.

In testimony whereof I affix my signature in presence of two witnesses.

ROBERT C. PRATT.

Witnesses:
 WEBB THOMAS,
 WILL BRANSON.

Copies of this patent may be obtained for five cents each, by addressing the "Commissioner of Patents, Washington, D. C."